April 8, 1941.　　　　L. A. DARSEY　　　　2,237,587
BRAKE RELEASING MECHANISM
Filed July 8, 1940　　　2 Sheets-Sheet 1

Inventor
L. A. DARSEY
By Leech & Radul, Attorneys

April 8, 1941.  L. A. DARSEY  2,237,587
BRAKE RELEASING MECHANISM
Filed July 8, 1940  2 Sheets-Sheet 2
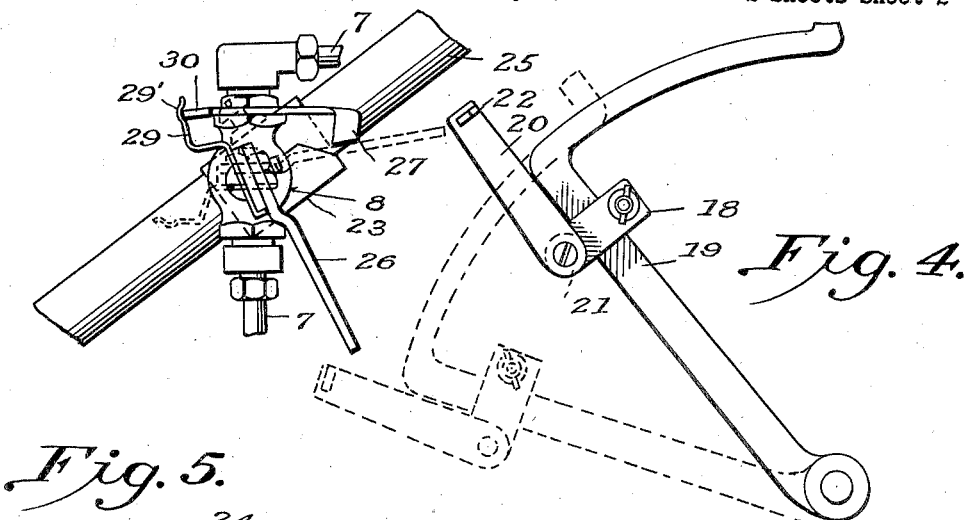
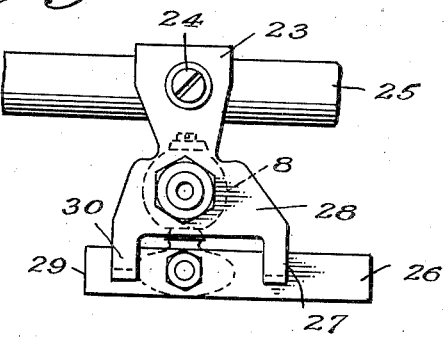
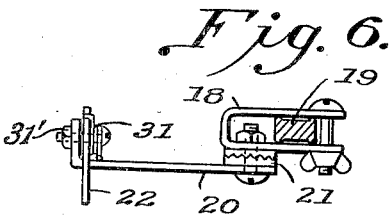
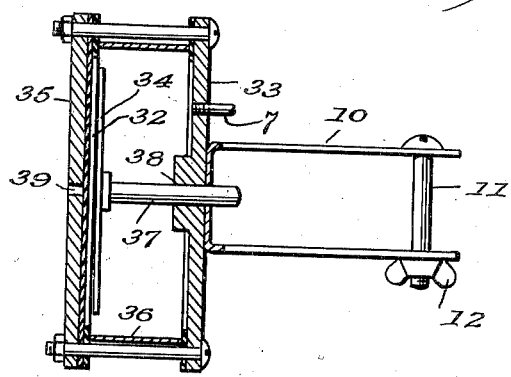
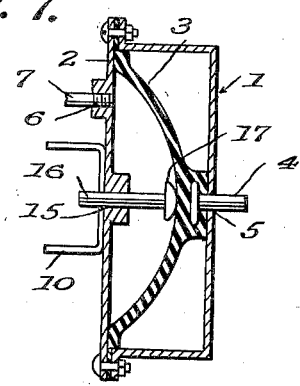
Inventor
L. A. DARSEY
By Leech & Radue
Attorneys Patented Apr. 8, 1941

2,237,587

UNITED STATES PATENT OFFICE 2,237,587

BRAKE RELEASING MECHANISM

Lowndes A. Darsey, Sebring, Fla., assignor of one-half to George T. Whitehouse, Sebring, Fla.

Application July 8, 1940, Serial No. 344,420

7 Claims. (Cl. 192—13)

This invention relates to a brake releasing mechanism for motor vehicles, and more particularly to novel means for automatically releasing the hand brake of automobiles upon engagement of the clutch.

An object of this invention is to provide an automatic hand brake releasing means which optionally will permit clutch engagement without release of the brake when so desired so that the driver may leave the car standing on an incline with the engine running.

Another object of this invention is to make it impossible for a motorist to drive an automobile with the hand brake engaged or partially engaged so as to damage or destroy brake linings.

A still further object of this invention is to prevent a car from rolling backwardly or forwardly without the use of the foot brakes when stopped on a grade by enabling motorists to set the hand brake which subsequently is automatically released on engagement of the clutch in starting up again in either direction.

It is a further object of this invention to provide automatic hand brake releasing means which is operated by the vacuum existing in the intake manifold of a running automobile engine.

This invention also contemplates automatic hand brake releasing menas which is comparatively simple in construction, strong, durable, reliable in operation, and which may be manufactured and installed at low cost.

Other important objects, advantages and features of the invention will be apparent from the following description and accompanying drawings.

Referring now to the drawings—

Fig. 4 is a side elevation showing the vacuum valve in position secured by a bracket to the steering column and the trip mechanism therefor attached to the clutch pedal;

Fig. 5 is a top plan view of the valve supporting bracket mounted on the steering column;

Fig. 6 is a top plan view of the details of the trip lever and bracket mounted on the clutch pedal which is shown in cross-section;

Fig. 7 is a cross-section view of a modified form of cylindrical casing and vacuum cup trigger operating mechanism; and Fig. 8 is a transverse section of the trigger release operating mechanism shown in Fig. 3.

Figure 1:
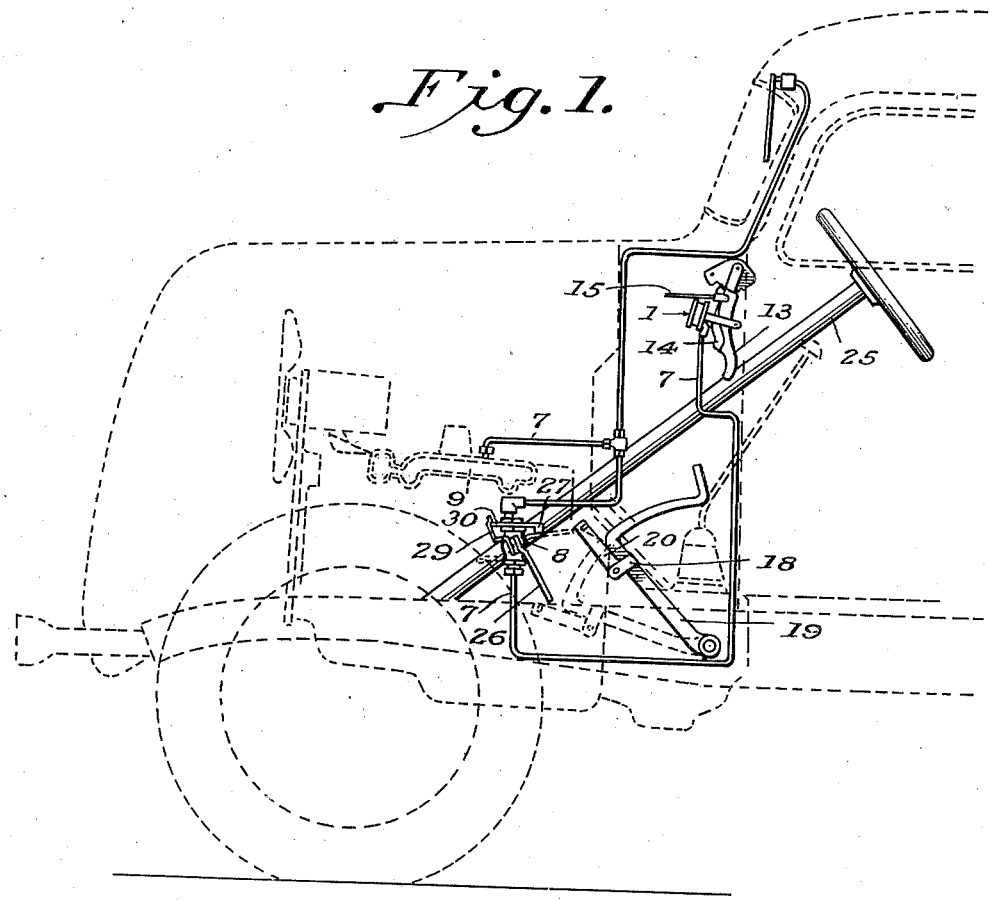
Fig. 1 is a diagrammatic view of my device installed in the conventional automobile.
Figure 2:
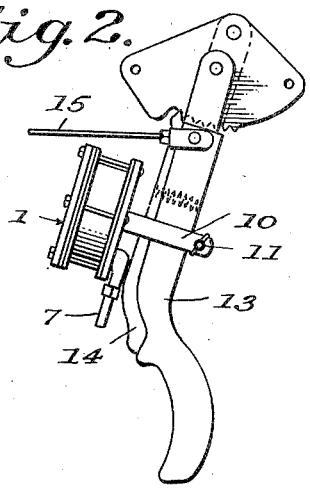
Fig. 2 is a side elevation of the hand brake trigger releasing mechanism in operating position.

On further reference to the drawings, it will be seen that numeral 1 indicates a cylindrical casing which is readily detachable from annular cover plate 2 and contains vacuum cup 3 of rubber or the like clamped between the open edge of the casing 1 and the cover plate 2 and having imbedded or formed therein guide pin 4 in registry with and extending through opening 5 of the cylinder 1. Numeral 6 denotes an internally threaded opening formed in the bottom 2 of cylindrical casing 1 and adapted to receive the externally threaded end of vacuum pipe 7 which connects the cylindrical casing 1 with a rotating plug valve 8 and intake manifold 9.

Secured to cylindrical casing 1 is a U-shaped clamp 10 containing bolt 11 and wing nut 12 for adjustably securing the casing to the handle of a conventional hand brake lever 13 of the type that includes a trigger 14 for releasing the brake handle which assumes its release or forward position under the action of the usual spring and draft rod 15.

Centrally located in bottom 2 of casing 1 is an opening through which extends plunger 16, having a stop abutment or head 17.

By means of a bracket 18 there is secured to the clutch pedal 19 a trip arm 20, having its angular position adjustable with respect to bracket 18 by means of a clamp connection 21. The outer end of arm 20 is bent at right angles to itself and supports a pivoted latch or trip member 22 lying parallel to the right angle portion. This trip member is secured to the arm end 20 by means of a nut and bolt 31' that also carries a spring 31 hooked over the pivoted latch to normally hold it in contact with the arm 20. A second bracket 23 is secured by set screw 24 to the steering post 25; vacuum control valve 8 has an operating arm 26 for controlling the admission of suction to cylinder 1. Instead of the position shown, the control valve 8 may lie parallel to steering column 25 by suitably forming supporting bracket 23 and this permits the valve 8 and bracket 23 to be assembled as a unit before installation.

As shown in Fig. 4, the vacuum line 7 leading from the intake manifold 9 is closed when the control valve operating arm 26 affixed to the valve plug is in the position shown by full lines, while the section of the vacuum line 7 leading from valve 8 to cylinder 1 is vented to the atmosphere. However, when valve operating arm 26 is moved to the position shown by the dotted lines, the vacuum in the intake manifold 9 is directly connected to cylinder 1 and the suction therefrom acts to collapse vacuum cup 3, thus forcing plunger 16 to the left, as seen in Fig. 7, to bear against trigger 14 of the brake handle.

Movement of arm 26 in its upward travel when opening the valve is limited by depending stop member 27 formed on the edge of the plate 28, while the closed position shown in full lines, to which arm 26 immediately returns by gravity, is maintained by means of a spring arm 29 secured to the valve plug abutting stop member 30 formed on the opposite edge of plate 28. The spring arm 29 has a depression 29' therein for frictional engagement with the edge of stop member 30.

Figure 3:
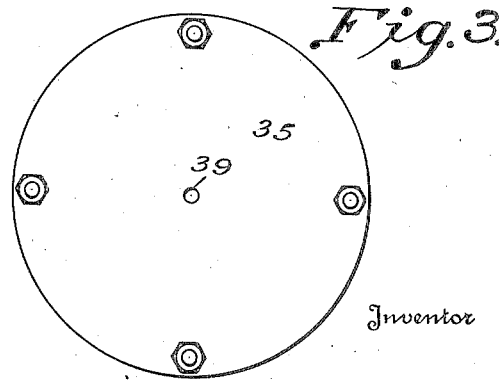
Fig. 3 is a top plan view of the operating mechanism.

Figs. 3 and 8 disclose a modification of the vacuum operating cylinder and consists of a flexible piston or diaphragm element 32 mounted in cylindrical casing 33. The diaphragm 32 has a backing plate 34 and the peripheral edge is clamped between the cylinder head 35 and the cylinder 36. An operating rod 37 secured to piston 31 passes through opening 38 in the bottom cylinder wall to strike the hand brake trigger 14 when vacuum is admitted into the vacuum line 7. A vent opening 39 is provided in the cylinder head to allow free flexing of the diaphragm.

If either the piston element 31 or the vacuum cup 3 becomes damaged in any way, it may be replaced at low cost by simply removing the cover of cylindrical casing 1 and inserting the new part. When the cover is replaced, vacuum cup 3 is firmly held against the bottom of the cylindrical casing so as to readily collapse when a vacuum commences to form therein.

The operation of the invention will now be described. In Fig. 4 the engaged position of clutch pedal 19 is shown in full lines. Assume now that the automobile is to be stopped with the engine running. In order to shift gears, it will be necessary to depress clutch pedal 19 to its dotted line position. As the pedal is depressed, the trip arm 22 will strike valve controlling arm 26, but will pivot about bolt 21, thus permitting trip arm 20 to pass by the lower position of valve arm 26 and come to rest immediately thereunder, trip arm 22 resuming its normal position against trip arm 20.

On movement of the clutch pedal 19 to its full line or engaged position, trip arm 22 immediately engages valve controlling arm 26, raising it to its dotted line position at which time it slips off trip arm 22 and returns to its full line position by gravity. This upward motion of valve controlling arm 26 opens the valve and connects intake manifold 9 by means of vacuum pipe 7 to the diaphragm 31 or the underside of vacuum cup 3 to project trigger rods 16 or 34 to release hand brake 13, which will obviously assume its forward or release position under the action of the spring and draft rod or wire with which all hand brakes of this type are provided.

Thus, it will be seen that immediately before clutch pedal 19 reaches its full line or engaged position, hand brake 13 will be automatically released, preventing a motorist from driving with the brake engaged or partially so, and saving wear and tear on the car and its various parts.

This invention also enables the driver to use his hand brake to hold his car, while stopping on an incline without encountering the usual danger of stalling on starting up again. The driver merely puts the engine in gear, steps on the accelerator, engages the clutch in the usual manner and starts forward without danger of rolling backward as the hand brake remains on until immediately before engagement of the clutch as hereinbefore explained.

Another important advantage of the invention is that the driver of a car so equipped may leave his car standing on an incline unattended and with the motor running, if he so desires. To do this, the gear is put in neutral, the hand brake is held on and the clutch is then engaged. It will be obvious in this connection that through the automatic releasing means, the brake is manually restrained from assuming its release or off position.

It will be obvious that the positions of valve controlling arm 26 and trip arm 20 may be adjusted with respect to each other so as to secure satisfactory operation with regard to the actual point of engagement of the clutch. For example, bracket 18 and supporting arm 20 may be moved toward arm 26 so as to strike it very close to the valve in order that the valve is fully open when arm 20 carrying trip arm 22 has traveled only a short distance in its upward course.

Having now described one preferred embodiment of the invention, it is to be understood that changes in the details of construction and in the combination and arrangement of parts may be resorted to which fall within the scope of the invention as claimed.

What I claim as new and desire to secure by Letters Patent of the United States is:

1. A brake releasing apparatus for motor vehicles having an intake manifold and a trigger released hand set brake comprising vacuum operated means mounted to operate the trigger of said brake, a valve, a pipe connecting said manifold with said valve and said means, a trip arm mounted on said valve, a clutch pedal, a second trip arm secured thereto and cooperating with said first trip arm to open said valve and effect the release of said brake trigger.

2. In a brake releasing apparatus for motor vehicles, a hand brake including a trigger therefor, a cylinder mounted on said hand brake, a vacuum cup in said cylinder and connected to said trigger, an intake manifold, a valve, a pipe connecting said manifold with said valve and said cylinder, a trip arm mounted on said valve, a clutch pedal, a second trip arm secured thereto and cooperating with said first arm to open said valve and effect operation of said trigger when said clutch pedal is in its clutch engaging movement.

3. A brake releasing apparatus for motor vehicles having an intake manifold and including a hand brake and a trigger release therefor, a cylinder, a piston connected to said trigger and mounted in said cylinder, a valve, a trip arm connected thereto, a pipe connecting said intake manifold with said valve and said cylinder, a clutch pedal, a trip arm connected thereto and cooperating with said first mentioned trip arm to open said valve to permit suction to collapse said piston to effect release of said brake trigger.

4. A brake releasing apparatus for motor vehicles including a steering column, a hand set brake and a trigger therefor and comprising a vacuum operated means connected to said trigger, a valve, a trip arm pivotally secured thereto, a clutch pedal, a trip arm secured to said pedal and cooperating with said first mentioned trip arm to open said valve, and a bracket detachably connected to said steering column, said bracket including stop means for limiting movement of said first mentioned trip arm.

5. An automobile hand brake releasing mechanism comprising a hand set brake therefor having a trigger released pawl, a vacuum cylinder mounted on said hand brake, said cylinder being provided with a piston adapted to be projected to strike said brake trigger when vacuum is applied to said cylinder, a pipe leading from the said cylinder to a source of vacuum, a valve in said pipe line and an actuator for said valve, said actuator comprising an arm secured to the valve, and arranged to be moved into open position by the clutch pedal of the automobile in its clutch engaging movement.

6. A brake release of the character set forth in claim 5, wherein a pivoted arm is secured to the foot clutch pedal arm in such a manner as to pass by the said valve actuator arm without operating the same when the said pedal arm is depressed and to engage the said valve actuator arm when the pedal arm is moved upwardly.

7. A brake release of the character set forth in claim 5, wherein a pivoted arm is adjustably secured to the foot clutch pedal arm in such a manner as to pass by said valve actuator arm without operating the same when said pedal arm is depressed and to engage said valve actuator arm when the pedal arm is moved upwardly, the angular position of said pivoted arm being adjustable with respect to said foot clutch pedal arm to vary the time of engagement of said valve actuator arm by said pivoted arm.

LOWNDES A. DARSEY.